US 7,085,541 B2

(12) United States Patent
Redi et al.

(10) Patent No.: US 7,085,541 B2
(45) Date of Patent: Aug. 1, 2006

(54) SYSTEMS AND METHODS FOR DIRECTIONAL ANTENNA POWER CONTROL IN A WIRELESS NETWORK

(75) Inventors: Jason Keith Redi, Belmont, MA (US); Keith William Manning, Arlington, MA (US); Mitchell Paul Tasman, Boston, MA (US)

(73) Assignee: BBNT Solutions LLC, Cambridge, MA (US)

( * ) Notice: Subject to any disclaimer, the term of this patent is extended or adjusted under 35 U.S.C. 154(b) by 343 days.

(21) Appl. No.: 10/355,311

(22) Filed: Jan. 31, 2003

(65) Prior Publication Data

US 2004/0152420 A1 Aug. 5, 2004

(51) Int. Cl.
*H04B 1/00* (2006.01)
*H04B 7/00* (2006.01)

(52) U.S. Cl. ............... 455/69; 455/63.1; 455/63.4; 455/67.11; 455/67.13; 455/522; 455/562.1; 455/13.4; 342/367; 342/372; 370/338; 370/346

(58) Field of Classification Search .......... 455/69, 455/63.1, 63.4, 67.11, 67.13, 522, 562.1, 455/13.4, 500, 25, 62, 68; 342/367, 368
See application file for complete search history.

(56) References Cited

U.S. PATENT DOCUMENTS

| | | | |
|---|---|---|---|
| 5,418,539 A | | 5/1995 | Sezai |
| 6,097,957 A | | 8/2000 | Bonta et al. |
| 6,130,881 A | * | 10/2000 | Stiller et al. ............. 370/238 |
| 6,188,911 B1 | * | 2/2001 | Wallentin et al. ......... 455/524 |
| 6,262,684 B1 | | 7/2001 | Stewart et al. |
| 6,304,215 B1 | * | 10/2001 | Proctor et al. ............. 342/372 |
| 6,400,317 B1 | * | 6/2002 | Rouphael et al. .......... 342/367 |
| 6,404,386 B1 | * | 6/2002 | Proctor et al. ............. 342/368 |
| 6,476,773 B1 | * | 11/2002 | Palmer et al. ............. 343/795 |
| 6,490,461 B1 | * | 12/2002 | Muller ..................... 455/522 |
| 6,498,939 B1 | * | 12/2002 | Thomas .................. 455/562.1 |
| 6,611,231 B1 | * | 8/2003 | Crilly et al. ............... 342/378 |
| 6,735,178 B1 | * | 5/2004 | Srivastava et al. ......... 370/252 |
| 6,804,208 B1 | * | 10/2004 | Cain et al. ................. 370/326 |
| 6,816,115 B1 | * | 11/2004 | Redi et al. ................. 342/367 |
| 2002/0186167 A1 | | 12/2002 | Anderson |
| 2003/0222819 A1 | | 12/2003 | Karr et al. |
| 2005/0134403 A1 | | 6/2005 | Kajiya |

OTHER PUBLICATIONS

U.S. patent application entitled "Systems and Methods for Three Dimensional Antenna Selection and Power Control in an AD–HOC Wireless Network"; filed on Jan. 31, 2003; Jason Keith Redi et al; 58 pages.

U.S. patent application entitled "Systems and Methods for Antenna Selection in an AD–HOC Wireless Network"; Jason Keith Redi et al.; filed on Jan. 31, 2003; 43 pages.

Ko, Y.B. et al. Medium Access Control Protocols Using Directional Antennas in Ad Hoc Networks. INFOCOM 2000. 19th Annual Joint Conference of the IEEE Computer and Communications Societies. IEEE, 1:13–31 (2000).

(Continued)

*Primary Examiner*—Marceau Milord
(74) *Attorney, Agent, or Firm*—Fish & Neave IP Group Ropes & Gray LLP

(57) ABSTRACT

A node (105-1) determines a power level for transmitting to a neighboring node (105-2) in a wireless network (100). The node (105-1) receives one or more messages indicating a location of the neighboring node and a type of directional antenna of the neighboring node (105-2) that transmitted the one or more messages. The node (105-1) determines the power level for transmitting to the neighboring node (105-2) based on the location of the neighboring node (105-2) and the type of the directional antenna.

42 Claims, 13 Drawing Sheets

OTHER PUBLICATIONS

Nasipuri, A. et al. A MAC Protocol for Mobile Ad Hoc Networks Using Directional Antennas. Wireless Communications and Networking Conference 2000. WCNC. 2000 IEEE, 3:1214–19. (2000).

Mauve, M. et al. A Survey on Position–Based Routing in Mobile Ad Hoc Networks. Network, IEEE. 15:6, 30–9 (2001).

Hong, X. et al. Scalable Routing Protocols for Mobile Ad Hoc Networks. Network, IEEE. 16:4, 11–21. (2002).

Huan, Z. et al. A Busy–Tone Based Directional MAC Protocol for Ad Hoc Networks. MILCOM 20002. Proceedings. IEEE vol 2. 1233–38. (2002).

Florens, C. et al. Scheduling Algortihms for Wireless Ad–Hoc Sensor Networks. Global Telecommunications Conference, 2002. GLOBECOM '02 IEEE. vol. 1., 6–10 (2002).

* cited by examiner

ANTENNA TO PLATFORM AZIMUTH TABLE
400

| ANTENNA NUM 410 | ANTENNA TYPE 415 | PLATFORM AZIMUTH MIN 420 | PLATFORM AZIMUTH MAX 425 | PLATFORM AZIMUTH CENTER 430 |
|---|---|---|---|---|
| 1 | TYPE_2 | 0 | 90 | 45 |
| 2 | TYPE_1 | 91 | 180 | 136 |
| 3 | TYPE_2 | 180 | 270 | 226 |
| ⋮ | ⋮ | ⋮ | ⋮ | ⋮ |
| M | TYPE_3 | 271 | 359 | 316 |

TABLE ENTRIES 405

FIG. 4

NEIGHBOR TO NORTH AZIMUTH TABLE
500

| NEIGHBOR ID 510 | NORTH AZIMUTH 515 |
|---|---|
| 1 | 32 |
| 2 | 22 |
| 3 | 51 |
| ⋮ | ⋮ |
| M | 200 |

TABLE ENTRIES 505

FIG. 5

SYSTEMS AND METHODS FOR DIRECTIONAL ANTENNA POWER CONTROL IN A WIRELESS NETWORK

RELATED APPLICATION

The present application relates to co-pending application Ser. No. 10/355,503, entitled "Systems and Methods for Antenna Selection in an Ad-Hoc Wireless Network," filed on Jan. 31, 2003, the disclosure of which is incorporated by reference herein.

The present application further relates to co-pending application Ser. No. 10/355,556, entitled "Systems and Methods for Three Dimensional Antenna Selection and Power Control in an Ad-Hoc Wireless Network," filed on Jan. 31, 2003, the disclosure of which is incorporated by reference herein.

GOVERNMENT CONTRACT

The U.S. Government has a paid-up license in this invention and the right in limited circumstances to require the patent owner to license others on reasonable terms as provided for by the terms of Contract No. DAAD19-01-C-0027, awarded by the Department of the Army.

FIELD OF THE INVENTION

The present invention relates generally to wireless networks and, more particularly, to systems and methods for controlling transmit power levels associated with directional antennas of nodes in such networks.

BACKGROUND OF THE INVENTION

Wireless data communication is often required in an environment where communications infrastructure, such as base stations or a wired backbone network, does not exist or is uneconomical or impractical to use. For example, in military or emergency environments, adequate infrastructure often does not exist in necessary locations and constructing such an infrastructure would be either impractical or uneconomical for the short-term use that is often required. Mobile multi-hop wireless networks have, therefore, been developed to provide wireless data communications in such environments.

In a conventional mobile wireless multi-hop network, each wireless node acts as a packet router that relays packets to other nodes in the network over an air interface link without routing the packets through any portion of a conventional cellular network, such as the wired backbone network, base station controllers, or base stations. Each wireless node, however, is limited in the distance over which it can reliably transmit, with transmission ranges of between a few feet and hundreds of feet being typical. Therefore, in communication environments that span large areas or have significant radio interference, packets transmitted from a sending node must often be hopped over multiple nodes in the wireless network to reach a destination. For such a multi-hop wireless network to perform effectively, all nodes must, therefore, be prepared to route packets on behalf of other nodes.

Conventionally, wireless ad-hoc networks employ omni-directional antennas for sending and receiving routed packet data. Use of omni-directional antennas, however, has the drawback that spatial re-use of the shared frequency space is limited. This limited spatial re-use results in lower throughput and higher latencies that reduces the performance of ad-hoc networks.

Therefore, there exists a need for systems and methods that can increase the spatial re-use of the shared frequency space associated with wireless, ad-hoc networks.

SUMMARY OF THE INVENTION

Systems and methods consistent with the present invention address this and other needs by implementing one or more directional antennas, or an omni-directional antenna, in nodes of an ad-hoc, multi-hop, wireless network. Consistent with the present invention, directional antennas, such as, for example, switched beam or steered beam types of directional antennas, may be used for transmitting and/or receiving packets. Use of directional antennas, consistent with the present invention, permits the effective division of the shared frequency space into smaller regions, thus, increasing spatial re-use in the network. Increasing the spatial re-use results in higher throughput and lower latencies in the network, as compared to exclusive use of omni-directional antennas.

Location-determining techniques, such as, for example, Global Positioning System (GPS) signals, or other techniques, may, consistent with the present invention, be employed to determine locations of neighboring nodes in the network. The determined locations may be used as a basis for determining headings between a transmitting and receiving node that can, in conjunction with known antenna gain patterns associated with one or more directional antennas of the transmitting and receiving nodes, be used for selecting an appropriate transmit power. The selected transmit power, thus, may ensure an adequate receive signal strength at the receiving node that accounts for the orientation of the directional antennas of the transmitting and receiving nodes relative to one another. The selected transmit power may additionally include a minimal transmit power that provides an adequate receive signal strength at the receiving node. The minimized transmit power may serve to increase spatial re-use in the system due to less noise interfering with the transmissions of other nodes.

In accordance with the purpose of the invention as embodied and broadly described herein, a method of determining transmit power at a first node in a wireless network is provided. The method includes receiving one or more messages from a second node, the one or more messages indicating a location of the second node and a directional antenna associated with the second node that transmitted at least one of the one or more messages. The method further includes determining an angle between the directional antenna of the second node and the first node based on the location of the second node and determining a gain of the directional antenna at the determined angle to produce a transmit antenna gain. The method also includes determining the transmit power for transmitting to the second node based on the transmit antenna gain.

In a further implementation consistent with the present invention, a method of determining a power level for transmitting to a neighboring node in a wireless network is provided. The method includes receiving, at a first node, one or more messages indicating a location of the neighboring node and a type of directional antenna of the neighboring node that transmitted the one or more messages. The method further includes determining the power level for transmitting to the neighboring node based on the location of the neighboring node and the type of the directional antenna.

In an additional implementation consistent with the present invention, a method of determining a transmit power level is provided. The method includes maintaining, at a first node, a data structure that describes an array of antenna gains associated with an antenna gain pattern of a directional antenna. The method further includes receiving a message, transmitted from the directional antenna at a second node, that indicates a direction the directional antenna was pointing when the message was transmitted and retrieving an antenna gain from the data structure corresponding to the directional antenna and related to the direction the directional antenna was pointing. The method also includes controlling a first power level for transmitting from the first node to the second node based on the retrieved antenna gain.

BRIEF DESCRIPTION OF THE DRAWINGS

The accompanying drawings, which are incorporated in and constitute a part of this specification, illustrate exemplary embodiments of the invention and, together with the description, explain the invention. In the drawings.

FIGS. 4–7 illustrate exemplary data tables associated with each node of FIG. 1 consistent with the present invention;

DETAILED DESCRIPTION

The following detailed description of the invention refers to the accompanying drawings. The same reference numbers in different drawings may identify the same or similar elements. Also, the following detailed description does not limit the invention. Instead, the scope of the invention is defined by the appended claims.

Systems and methods consistent with the present invention provide mechanisms for implementing one or more directional antennas in nodes of an ad-hoc, multi-hop, wireless network for transmitting and/or receiving packets. In conjunction with the one or more directional antennas, location-determining techniques may, consistent with the present invention, be employed to determine locations of neighboring nodes in the network. The determined locations may be used as a basis for determining headings between a transmitting and receiving node that can, in conjunction with known antenna gain patterns associated with one or more directional antennas of the transmitting and receiving nodes, be used for selecting an appropriate transmit power. The selected transmit power may ensure an adequate receive signal strength at the receiving node that accounts for the orientation of the directional antennas of the transmitting and receiving nodes relative to one another. Systems and methods, consistent with the invention, thus, permit spatial re-use gains that allow directional antennas to be used to their fullest advantage.

Exemplary Ad-Hoc Network

Figure 1:
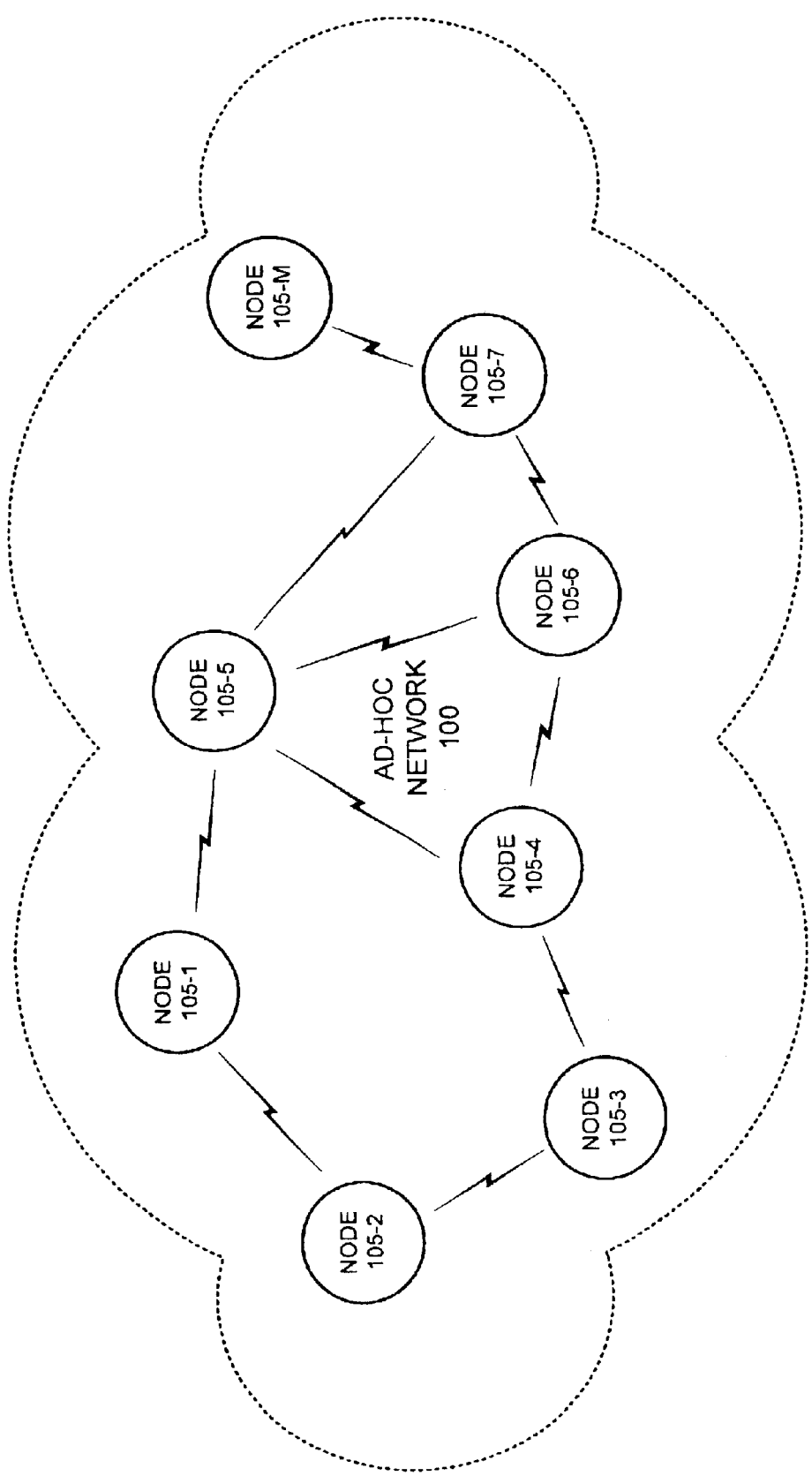
FIG. 1 illustrates an exemplary ad-hoc, multi-hop, wireless network in which systems and methods, consistent with the present invention, may be implemented.

FIG. 1 illustrates an exemplary ad-hoc, multi-hop, wireless network 100 consistent with the present invention. Network 100 may include multiple wireless nodes 105-1 through 105-M. The number of nodes shown in FIG. 1 is for illustrative purposes only. Fewer or greater numbers of nodes 105 may be employed in network 100 consistent with the present invention. Each node 105 of network 100 may route packets on behalf of other nodes and, thus, serve as an intermediate node between a packet source node and destination node in network 100. In addition to an omni-directional antenna, each node 105 may include one or more directional antennas (not shown) for transmitting and receiving packets. Alternatively, instead of using an omni-directional antenna, each node 105 may combine signals from multiple directional antennas.

Exemplary Node

Figure 2:
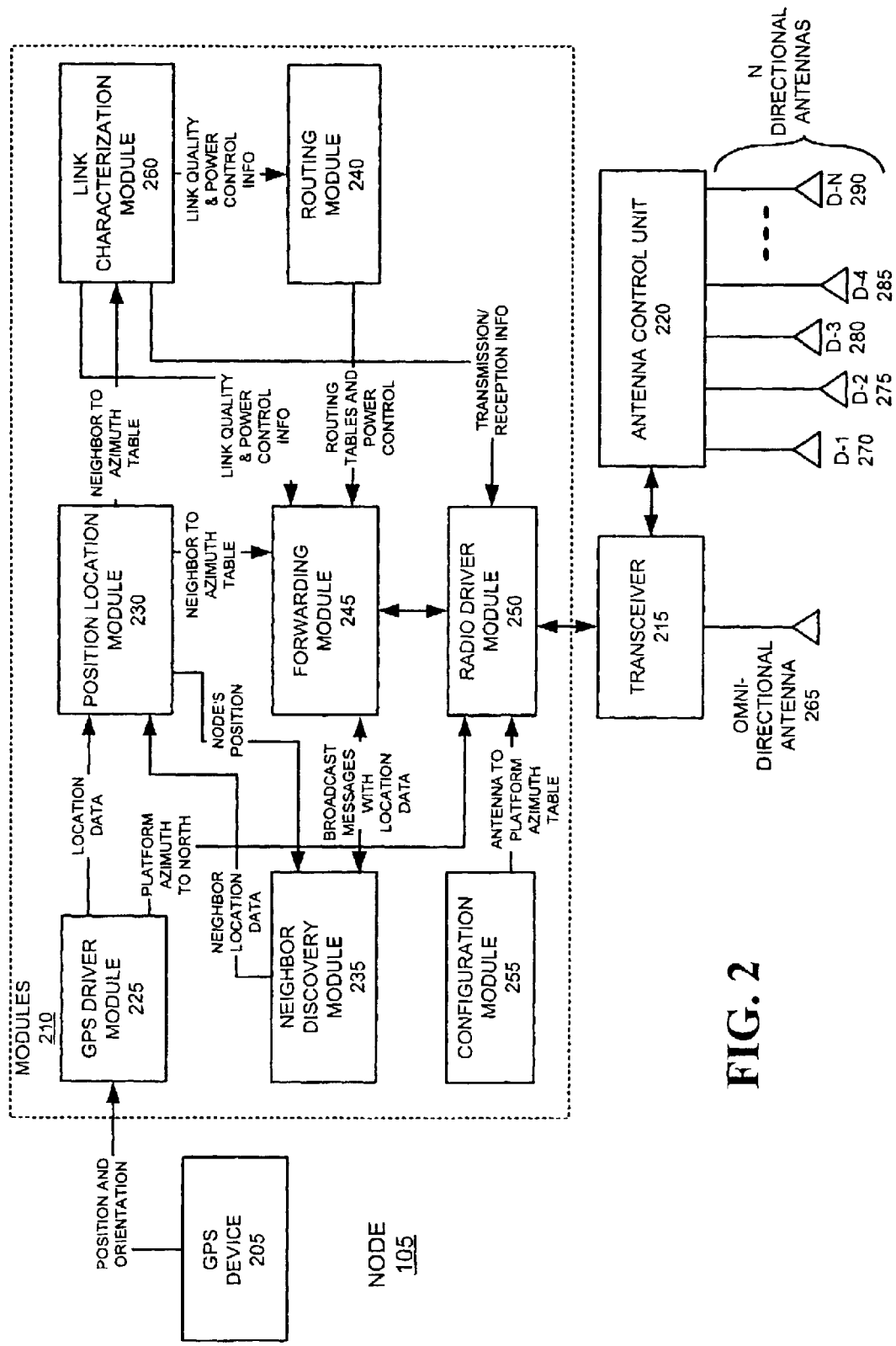
FIG. 2 illustrates exemplary components of a node of the network of FIG. 1 consistent with the present invention.

FIG. 2 illustrates exemplary components of a node 105 of network 100. Node 105 may include a GPS device 205, a number of modules 210, a transceiver 215, and an antenna control unit 220. GPS device 205 may include conventional GPS circuitry for receiving GPS signals, and providing position and orientation data derived from the GPS signals to GPS driver module 225. Transceiver 215 may include conventional circuitry for transmitting and receiving radio signals via either omni-directional antenna 265 or the N directional antennas 270–290. Transceiver 215 may select one or more antennas of the N directional antennas 270–290 via antenna control unit 220 for transmission or reception. Antenna control unit 220 may include, for example, an antenna switch for a switched beam type of directional antenna. Alternatively, antenna control unit 220 may include, for example, steering control for a steered beam type of directional antenna.

Modules 210 may include various modules, each of which may be implemented in software, hardware and/or firmware. If implemented in software, modules 210 may include instructions stored in a computer-readable medium, such as, for example, stored in or on random access memory (RAM), read only memory (ROM), a CD-ROM, or a diskette, for execution by a processing unit (not shown) such as, for example, a microprocessor. Modules 210 may include GPS driver module 225, position location module 230, neighbor discovery module 235, routing module 240, forwarding module 245, radio driver module 250, configuration module 255 and link characterization module 260.

GPS driver module 225 may receive position and orientation data from GPS device 205 and may determine a latitude, a longitude and an orientation that corresponds to the position and orientation data. GPS driver module 225 may further, based on historical position and orientation data received from the GPS device, determine a current heading of node 105. In addition to, or as an alternative to, conventional GPS mechanisms, module 225 may determine its location using any conventional technique for determining location. Such techniques may include, but are not limited to, determining location using conventional cellular network "E-911" location services or determining location by performing triangulation of signals transmitted by, for example, AM radio stations. Such techniques may further include a "dead reckoning" technique in which an initial location is known, and movement from that initial location may be tracked through knowledge of the distances and headings traversed from the initial location. Other techniques, such as using existing vehicle navigation systems or inertial management systems, may also be used.

Position location module 230 may keep track of node 105's position, and the position of other nodes 105 of network 100. Position location module 230 may provide node 105's position to neighbor discovery module 235. Neighbor discovery module 235 may pass neighbor location data received via forwarding module 245 and radio driver module 250 to position location module 230. Neighbor discovery module 235 may also place node 105's location into messages that are to be broadcast, for example, via omni-directional antenna 265. Neighbor discovery module 235 may also place node 105's location into messages that are to be transmitted via a single, or multiple antennas, of N directional antennas 270–290. The messages may, for example, be broadcast via the multiple antennas of N directional antennas 270–290 in a "searchlight" or "scanning" fashion.

Routing module 240 may construct routing tables in accordance with network 100 routing protocols. To assist in constructing routing tables, routing module 240 may receive link quality and power control information from link characterization module 260. Forwarding module 245 may consult routing tables provided by routing module 240 to construct and forward packets to appropriate destinations via neighboring nodes of network 100.

Radio driver module 250 may implement the Medium Access Layer (MAC) protocol and may determine the appropriate antenna of N directional antennas 270–290 for transmitting outgoing packets. Configuration module 255 may store data for configuring radio driver module 250. Such data may include, for example, one or more data tables that indicate the orientation of the N antennas 270–290 relative to node 105's platform. Link characterization module 260 may determine link quality and power control information related to transmitting and receiving packets to and from neighboring nodes of network 100.

Exemplary Directional Antenna Gain Pattern

Figure 3:
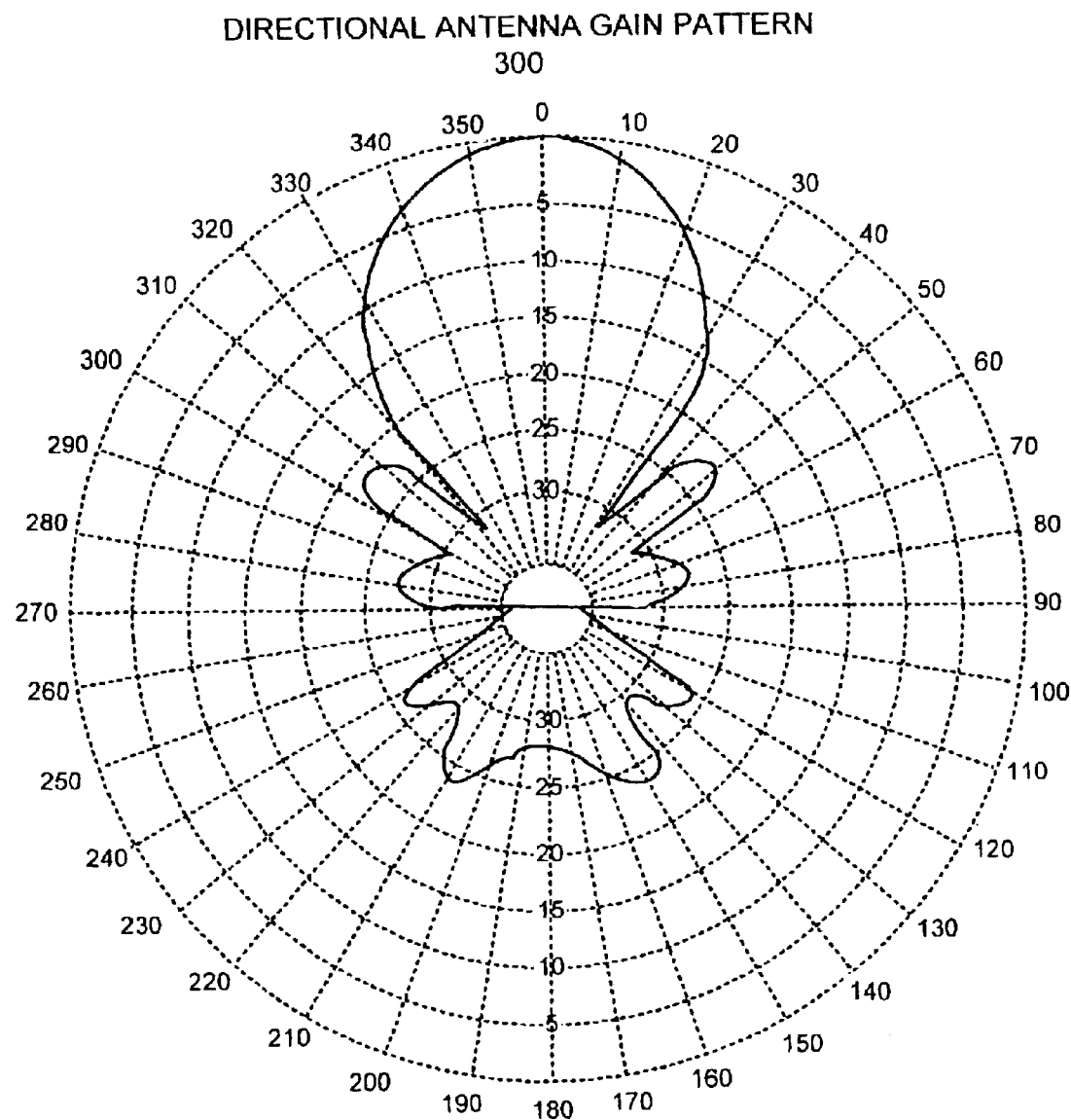
FIG. 3 illustrates an exemplary antenna gain pattern associated with a directional antenna of the node of FIG. 2.

FIG. 3 illustrates an exemplary directional antenna gain pattern 300 consistent with the present invention. Antenna gain pattern 300 represents a graphical representation of the gain of a directional antenna of N directional antennas 270–290 associated with each node 105 of network 100 at a particular elevation (e.g., 0 degrees elevation shown). As will be recognized in the art, antenna gain pattern 300 indicates the gain of a directional antenna as a function of an angle relative to the directional antenna. Antenna gain pattern 300, thus, indicates a transmit and receive gain associated with a corresponding directional antenna at a full 360 degrees surrounding a directional antenna at a particular elevation.

Exemplary Antenna to Platform Azimuth Table

FIG. 4 illustrates an exemplary table 400 that indicates, consistent with the present invention, the orientation of each of the N directional antennas 270–290 relative to a platform of a node 105. Table 400 may be stored in a memory device associated with a node 105. Table 400 may include multiple entries 405, each of which may include an antenna number 410, an antenna type 415, a platform azimuth minimum 420, a platform azimuth maximum 425, and a platform azimuth center 430. Antenna number 410 may include a value that uniquely identifies an antenna of N directional antennas 270–290. Antenna type 415 may indicate a type of the antenna identified by antenna number 410.

Platform azimuth minimum 420 and platform azimuth maximum 425 may represent the range of the antenna gain pattern (i.e., as shown in FIG. 3) associated with the antenna identified by antenna number 410. This range may not necessarily represent the 3 dB main lobes of the antenna gain pattern, but may represent an approximate range of azimuth values appropriate for transmitting a packet. Platform azimuth minimum 420 may include an angle (e.g., degrees or radians), referenced to node 105's platform, that indicates a minimum angle of an antenna gain pattern associated with the antenna identified by antenna number 410. Platform azimuth maximum 425 may include an angle, referenced to node 105's platform, that indicates a maximum angle of the antenna gain pattern associated with the antenna identified by antenna number 410. Platform azimuth minimum 420 and platform azimuth maximum 425 values associated with all the entries of table 400 may include gaps in coverage of the N directional antennas 270–290. In the case of gaps in antenna coverage, node 105 may use omni-directional antenna 265 for transmitting and/or receiving packets. Platform azimuth center 430 may indicate a center angle that describes the direction the antenna identified by antenna number 410 is pointing relative to node 105's platform.

Exemplary Neighbor to North Azimuth Table

FIG. 5 illustrates an exemplary table 500 that indicates, consistent with the present invention, a heading associated with each of the neighboring nodes of a node 105 of network 100. Table 500 may be stored in a memory device associated with a node 105. Table 500 may include multiple entries 505, each of which may include a neighbor identifier 510 and a north azimuth 515. Neighbor identifier 510 may uniquely identify a neighboring node 105 of network 100. Neighbor identifier 510 may, for example, include a MAC address associated with a neighboring node. North azimuth 515 may include a value in, for example, degrees (though radians may be used) that represents an angle measured clockwise from true north from node 105 to neighboring node identified by neighbor identifier 510. Entries 505 of table 500 may be aged based on the time a previous update for each entry was received. The aging of each entry 505 may occur according to a configurable timer.

Exemplary Antenna Gain Table

Figure 6:
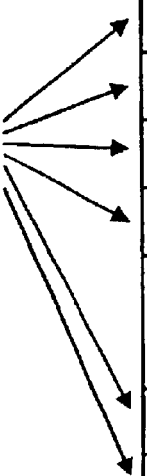

FIG. 6 illustrates an exemplary antenna gain table 600 associated with a directional antenna of N directional antennas 270–290 of a node 105. Antenna gain table 600 may be stored in a memory device associated with a node 105. Antenna gain table 600 may include one or more entries 605, each of which may include an antenna type 610, an angle relative to center 615, and an antenna gain 620. Antenna type 610 may indicate a type of an antenna of N directional antennas 270–290. Angle relative to center 615 may indicate an angle, either clockwise or counterclockwise, relative to a designated center angle of the antenna corresponding to the type of antenna designated by antenna type 610. Antenna gain 620 may indicate a gain of the antenna that corresponds to the type of antenna designated by antenna type 610 at the entry 605's angle relative to center 615.

Exemplary Neighbor Transmit Power Table

Figure 7:
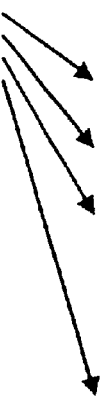

FIG. 7 illustrates an exemplary table 700 for determining a transmit power for transmitting to a neighboring node 105 of network 100. Table 700 may be stored in a memory device associated with a node 105 that neighbors each of the nodes identified in table 700. Table 700 may include one or more entries 705, each of which may include a neighbor identifier 710 and a transmit (Xmit) power value 715. Neighbor identifier 710 may uniquely identify a neighboring node 105 of network 100. Neighbor identifier 710 may, for example, include a MAC address associated with a neighboring node. Xmit power value 715 may indicate a power level for transmitting data to a neighboring node 105 of network 100 designated by neighbor identifier 710.

Exemplary Node Location Transmission Process

Figure 8:
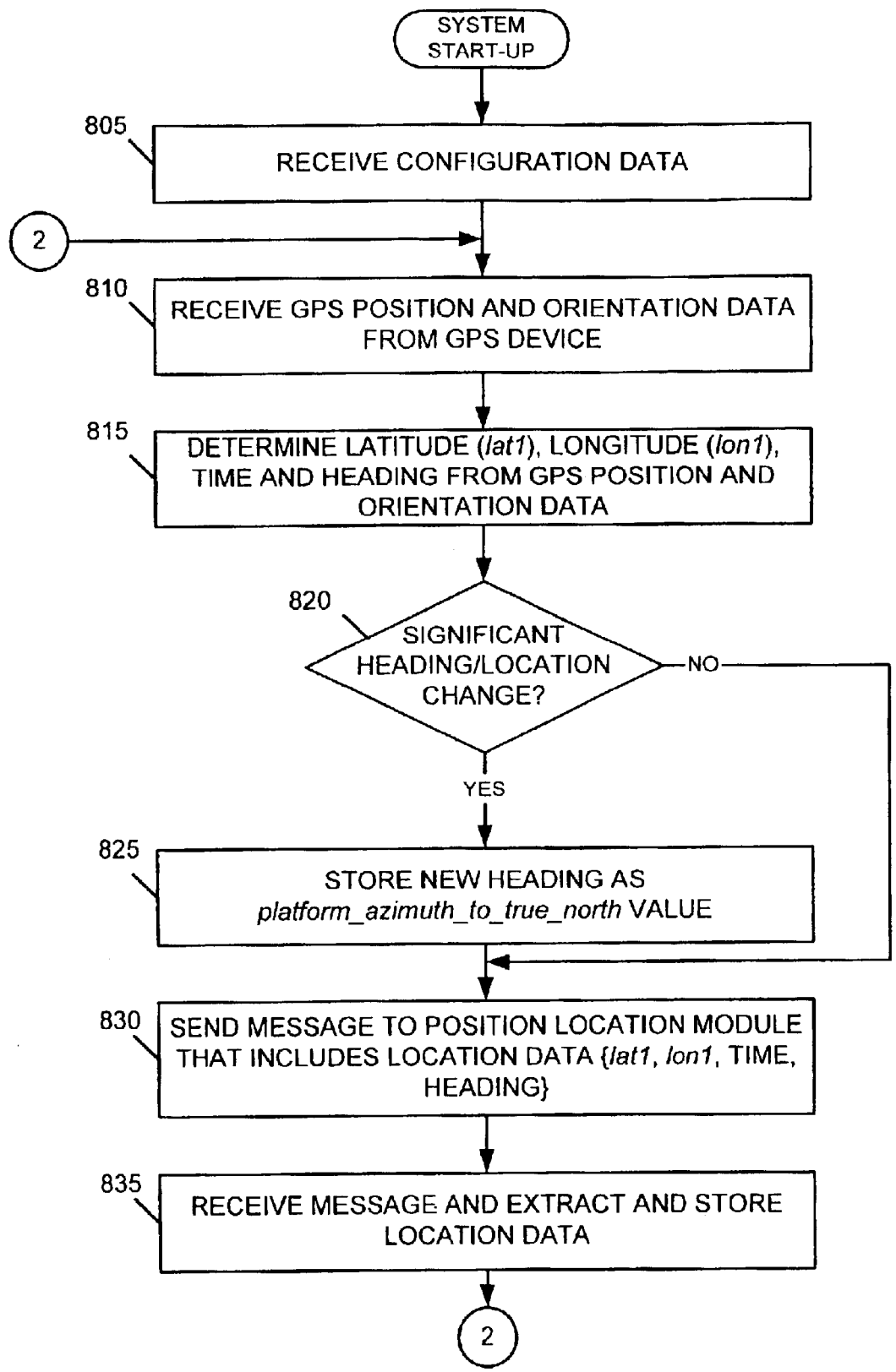
FIGS. 8–9 are flow charts that illustrate a node location broadcast process consistent with the present invention.
Figure 9:
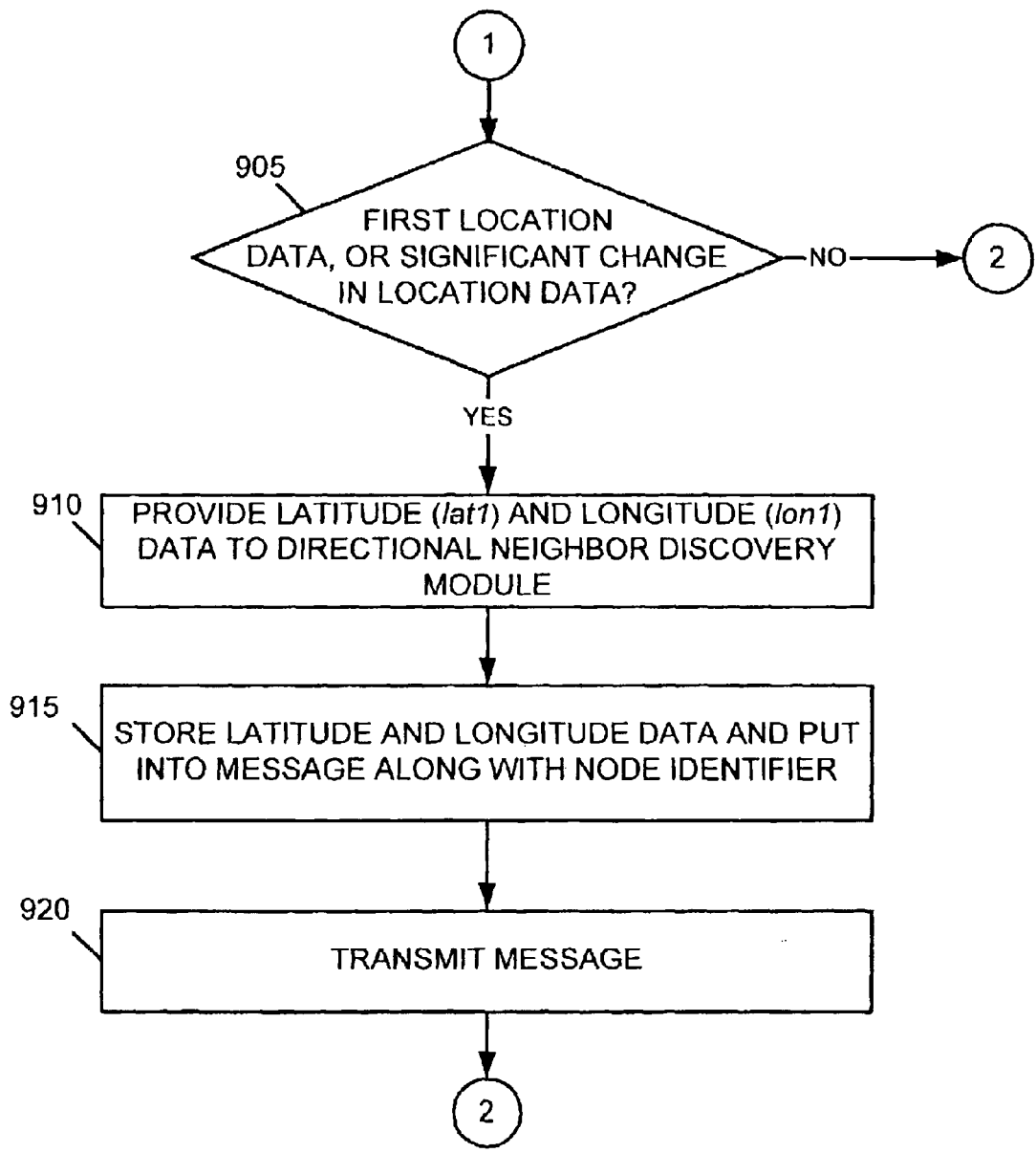

FIGS. 8–9 are flowcharts that illustrate an exemplary process, consistent with the present invention, for transmitting a current location of a node 105. As one skilled in the art will appreciate, the process exemplified by FIGS. 8–9 can be implemented as a sequence of instructions and stored in a memory associated with node 105 for execution by a processing unit. Alternatively, the process exemplified by FIGS. 8–9 can be implemented in hardware and/or firmware.

The exemplary process may begin with receipt of configuration data [act 805]. GPS driver module 225 may receive the configuration data from position location module 230. The configuration data may include, for example, an indication of how often GPS driver module 225 should provide GPS position and orientation data to position location module 230. GPS driver module 225 may then periodically receive the GPS data from GPS device 205 [act 810]. GPS driver module 225 may determine a latitude (lat1), longitude (lon1), heading and a time from the received GPS position and orientation data [act 815]. From the determined heading, GPS driver module 225 may determine whether there has been a significant heading change, or a significant change in location (i.e., significant change in lat1 and/or lon1) for node 105 [act 820]. If not, the exemplary process may continue at act 530 below. If there has been a significant heading or location change, then GPS driver module 225 may store the new heading as platform_azimuth_to_true_north value, indicating the angle of the heading of node 105 relative to true north [act 825]. GPS driver module 225 may then send a message to position location module 230 that includes the location data (e.g., lat1, lon1, time, heading) [act 830]. Position location module 230 may receive the message and extract and store the location data [act 835].

Position location module 230 may determine whether the extracted location data is the first received location data after system start-up, or whether the extracted location data represents a significant change in the location or orientation of node 105 [act 905](FIG. 9). If not, the exemplary process may return to act 810 above. If the location data is the first received location data, or represents a significant change in node 105's location or orientation, then position location module 230 may provide the latitude (lat1) and longitude (lon1) data to neighbor discovery module 235 [act 910]. Neighbor discovery module 235 may store the latitude and longitude data and put the data into a message along with node 105's node identifier [act 915]. Neighbor discovery module 235 may then send the message through forwarding module 245 and radio driver module 250 for transmission via omni-directional antenna 265, or via one, or multiple, antennas of N directional antennas 270–290 [act 920]. In some exemplary embodiments, the outgoing message may be transmitted via each directional antenna of N directional antennas 270–290 in a search light fashion. The outgoing message may include a message dedicated to carrying only location data (i.e., a location message). The outgoing message may further include any type of outgoing message, such as, for example, a data message, a Request-To-Send (RTS), a Clear-To-Send (CTS), or a network control message, onto which the location data and node identifier are "piggybacked."

Exemplary Neighbor Node Heading Determination Process

Figure 10:
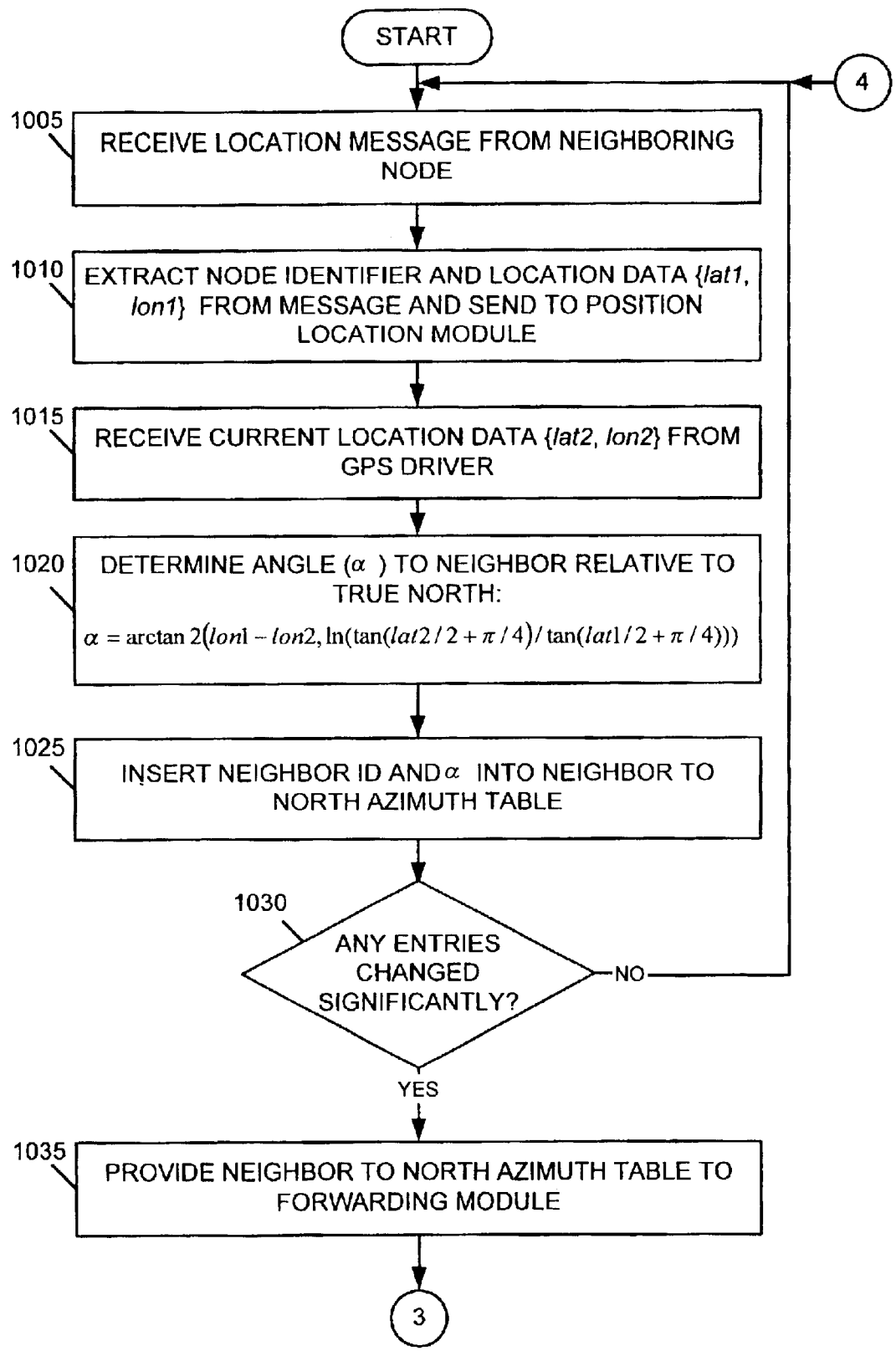
FIGS. 10–11 are flow charts that illustrate an exemplary process for determining a heading of a neighbor node relative to a reference heading consistent with the present invention.
Figure 11:
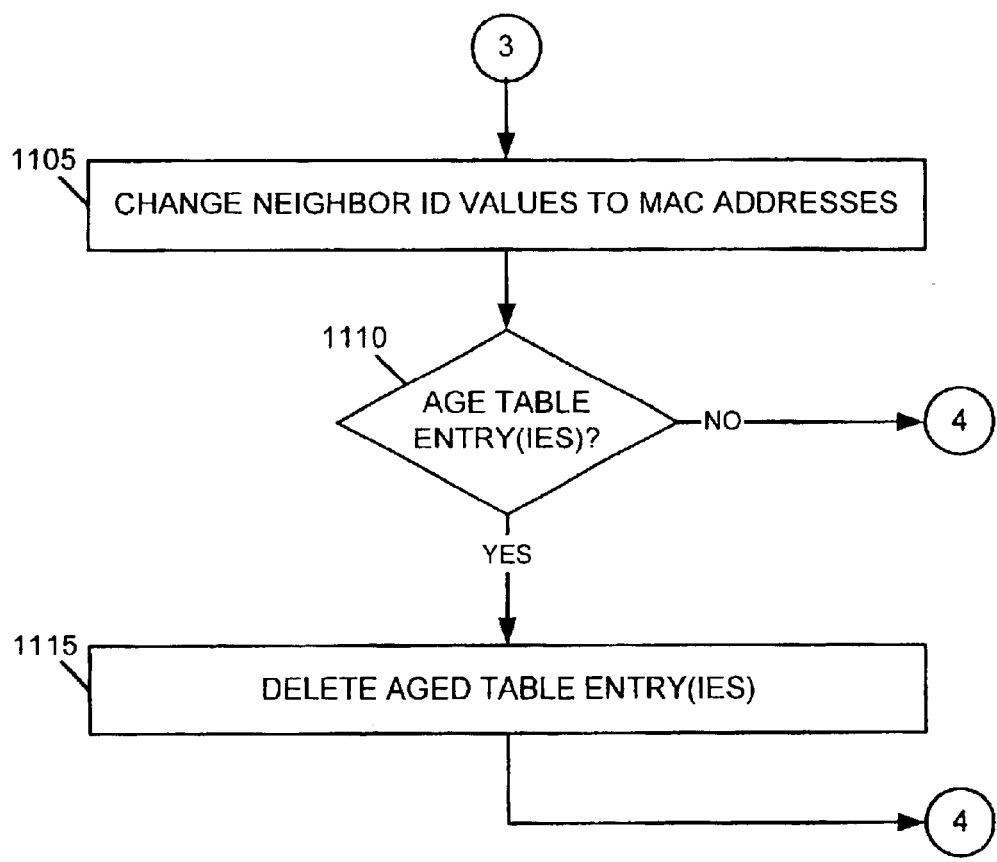
Figure 12:
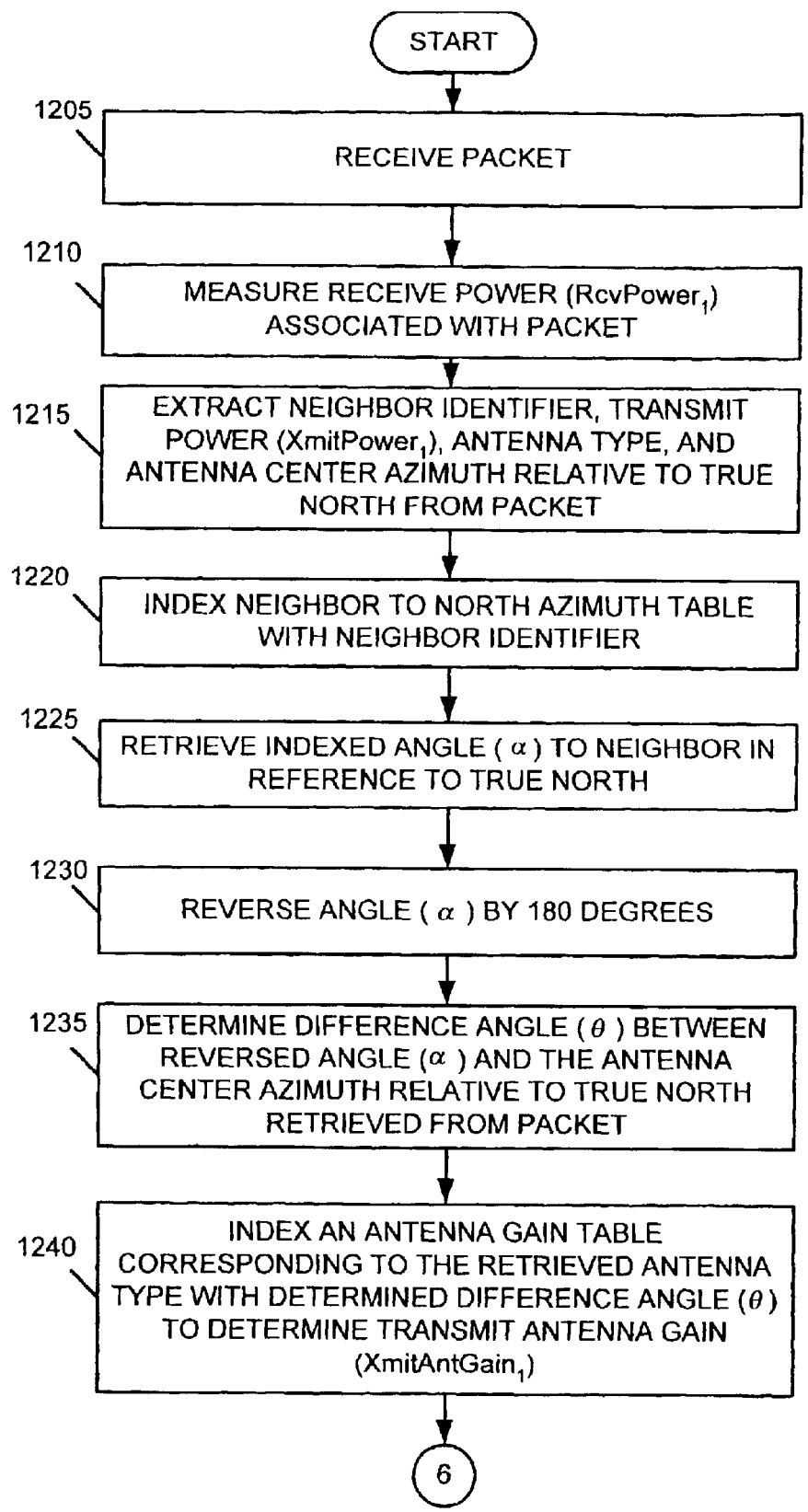
FIGS. 12–15 are flow charts that illustrate an exemplary process for selecting an antenna and determining a transmit power level for transmitting data to a neighboring node consistent with the present invention.
Figure 13:
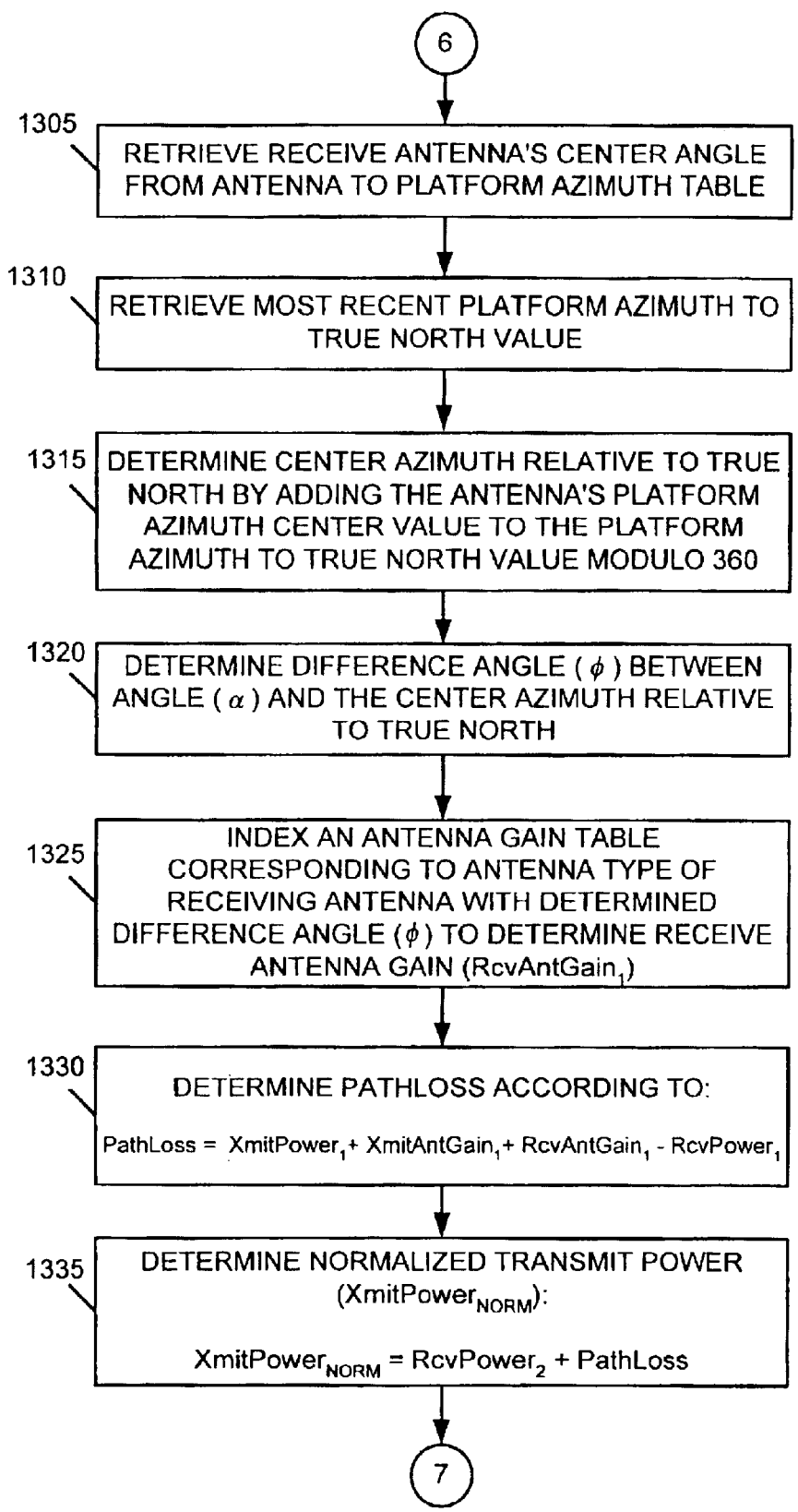

FIGS. 10–11 are flowcharts that illustrate an exemplary process, consistent with the present invention, for determining a heading of a neighbor node relative to a reference heading. As one skilled in the art will appreciate, the process exemplified by FIGS. 10–11 can be implemented as a sequence of instructions and stored in a memory associated with a node 105 for execution by a processing unit. Alternatively, the process exemplified by FIGS. 10–11 can be implemented in hardware and/or firmware.

The exemplary process may begin with the receipt of a message from a neighboring node 105 of network 100 that contains the neighboring node 105's location [act 1005]. The message may include a dedicated location data message, a data message, a Request-to-send (RTS), a Clear-to-Send (CTS), or a network control message with node identifier and location data "piggybacked" on the message. Neighbor discovery module 235 may receive the message via transceiver 215, radio driver module 250 and forwarding module 245. Neighbor discovery module 235 may extract a node identifier and location data {lat1, lon1} from the location message and send the identifier and location data to position location module 230 [act 1010]. Position location module 230 may further receive current location data {lat2, lon2} of the present node 105 from GPS driver 225 [act 1015]. Position location module 230 may determine an angle ($\alpha$) to the neighboring node relative to true north according to the following relation:

$$\alpha = \arctan2(lon1-lon2, \ln(\tan(lat2/2+\pi/4)/\tan(lat1/2+\pi/4))) \quad \text{Eqn. (1)}$$

where ln represents a natural log, lat and lon values are in radians, and $\alpha$ is measured clockwise from true north in radians [act 1020]. arctan 2(y,x) is a known function that determines the arctangent of y/x, with the sign of both of the arguments x and y being used to determine the quadrant of the result. The result of the function is a value in radians between $-\pi$ and $\pi$. Position location module 230 may insert the neighbor identifier and the determined angle $\alpha$ into neighbor to north azimuth table 500 as neighbor identifier 510 and north azimuth 515, respectively [act 1025]. Position location module 230 may determine whether any entries of table 500 have changed significantly [act 1030]. If so, the exemplary process may continue at act 1035. If no entries of table 400 have changed significantly, then the exemplary process may return to act 1005 above. Position location module 230 may provide a copy of the neighbor to north azimuth table 400 to forwarding module 245 [act 1035]. Forwarding module 245 may change the neighbor identifier values 505 of table 500 into corresponding MAC addresses [act 1105](FIG. 11). Forwarding module 245 may further determine whether to age any entries 505 of table 500 [act 1110]. Forwarding module 245 may use a configurable timer associated with each entry 505 of table 500 for determining whether to age each entry 405. If any entries 405 of table are to be aged, forwarding module 245 may delete the aged table entries of table 505 [act 1115].

Exemplary Transmit Power Determination Process

FIGS. 12–15 are flowcharts that illustrate an exemplary process, consistent with the present invention, for determining a transmit power for transmitting to a neighboring node 105 of network 100 via a directional antenna of N directional antennas 270–290. As one skilled in the art will appreciate, the method exemplified by FIGS. 12–15 can be implemented as a sequence of instructions and stored in a memory associated with a node 105 for execution by a processing unit. Alternatively, the process exemplified by FIGS. 12–15 can be implemented in hardware and/or firmware. Unless otherwise indicated, the exemplary acts of FIGS. 12–15 may be implemented by radio driver module 250 of node 105. In some embodiments, however, the exemplary acts of FIGS. 12–15 may be implemented by one or more other modules 210 of node 105.

The exemplary process may begin with the receipt of an incoming packet from a neighboring node 105 of network 100 at radio driver module 250 via transceiver 215 [act 1205]. A receive power level (RcvPower$_1$) associated with the received packet may be measured [act 1210]. Transceiver 215 may, for example, measure the receive power level and provide the receive power level to link characterization module 260. A neighbor identifier, transmit power (XmitPower$_1$), antenna type, and antenna center azimuth relative to true north value may be retrieved from the received packet. The neighbor identifier may identify the neighboring node 105 which sent the packet, the transmit power may indicate the power level at which the packet was transmitted at the neighboring node 105, the antenna type may indicate a type of the antenna which transmitted the packet, and the antenna center azimuth relative to true north value may indicate the center angle of the transmitting antenna relative to true north. The neighbor to north azimuth table 500 may be indexed with the extracted neighbor identifer to identify a table entry 505 with a matching neighbor ID 510 [act 1220]. The north azimuth value 515 of the identified table entry 505 may be retrieved [act 1225] and designated as an angle ($\alpha$) to the neighbor node, referenced to true north, from which the received packet was transmitted. The angle $\alpha$ may then be reversed by 180 degrees [act 1230].

A difference angle ($\theta$) between the reversed angle $\alpha$ and the antenna center azimuth relative to true north angle, extracted from the received packet, may be determined [act 1235]. The difference angle $\theta$ may represent an angle, relative to the neighbor's transmitting antenna center angle, that can be used to determine an antenna gain of the neighbor's antenna at that angle. An antenna gain table 600, whose antenna type 610 matches the antenna type extracted from the received packet, may be indexed with the determined difference angle ($\theta$) to determine a transmit antenna gain (XmitAntGain$_1$) associated with the antenna of the neighboring node that transmitted the received packet [act 1240]. To determine transmit antenna gain, a table entry 605 of table 600 may be identified whose angle relative to center 615 matches the determined difference angle ($\theta$), and the antenna gain 620 value of the identified entry 605 may be designated as the transmit antenna gain value (XmitAntGain$_1$).

The antenna center angle (i.e., platform azimuth center value 430), that corresponds to the antenna that received the packet transmission at the current node, may be retrieved from antenna to platform azimuth table 400 [act 1305]. The most recent platform_azimuth_to_true_north value, that specifies a heading of the platform of the current node relative to true north, may also be retrieved from memory [act 1310]. A center azimuth relative to true north value may be determined by adding the antenna's platform azimuth center value 430 to the platform_azimuth_to_true_north value modulo 360 [act 1315]. The center azimuth relative to true north value may represent the angle that the receiving antenna was pointing relative to true north. A difference angle ($\phi$) between angle $\alpha$ and the determined center azimuth relative to true north value may be determined [act 1320]. The difference angle $\phi$ may represent an angle, relative to the receiving antenna's center angle, that can be used to determine an antenna gain of the receiving antenna at that angle. An antenna gain table 600, corresponding to the antenna type 610 of the antenna that received the packet transmission, may be indexed with the determined difference angle $\phi$ to determine a receive antenna gain (RcvAntGain$_1$) that corresponds to the antenna that received the packet transmission at the current node [act 1325]. A pathloss between the transmitting neighbor node and the current node may then be determined [act 1330] according to the following relation:

Pathloss=XmitPower$_1$+XmitAntGain$_1$+
    RcvAntGain$_1$-RcvPower$_1$     Eqn. (2)

The Pathloss value may represent a symmetric path loss between the current node and the neighboring node [act 1335]. A normalized transmit power (XmitPower$_{NORM}$) may be determined according to the following relation:

XmitPower$_{NORM}$=RcvPower$_2$+PathLoss     Eqn. (3)

where RcvPower$_2$ is set to a value above an assumed signal detection threshold of the neighboring node. The normalized transmit power XmitPower$_{NORM}$ assumes 0 dB antenna gains at transmission and reception. Normalizing the transmit power permits the combination of data on estimated pathloss from many different antenna types.

Figure 14:
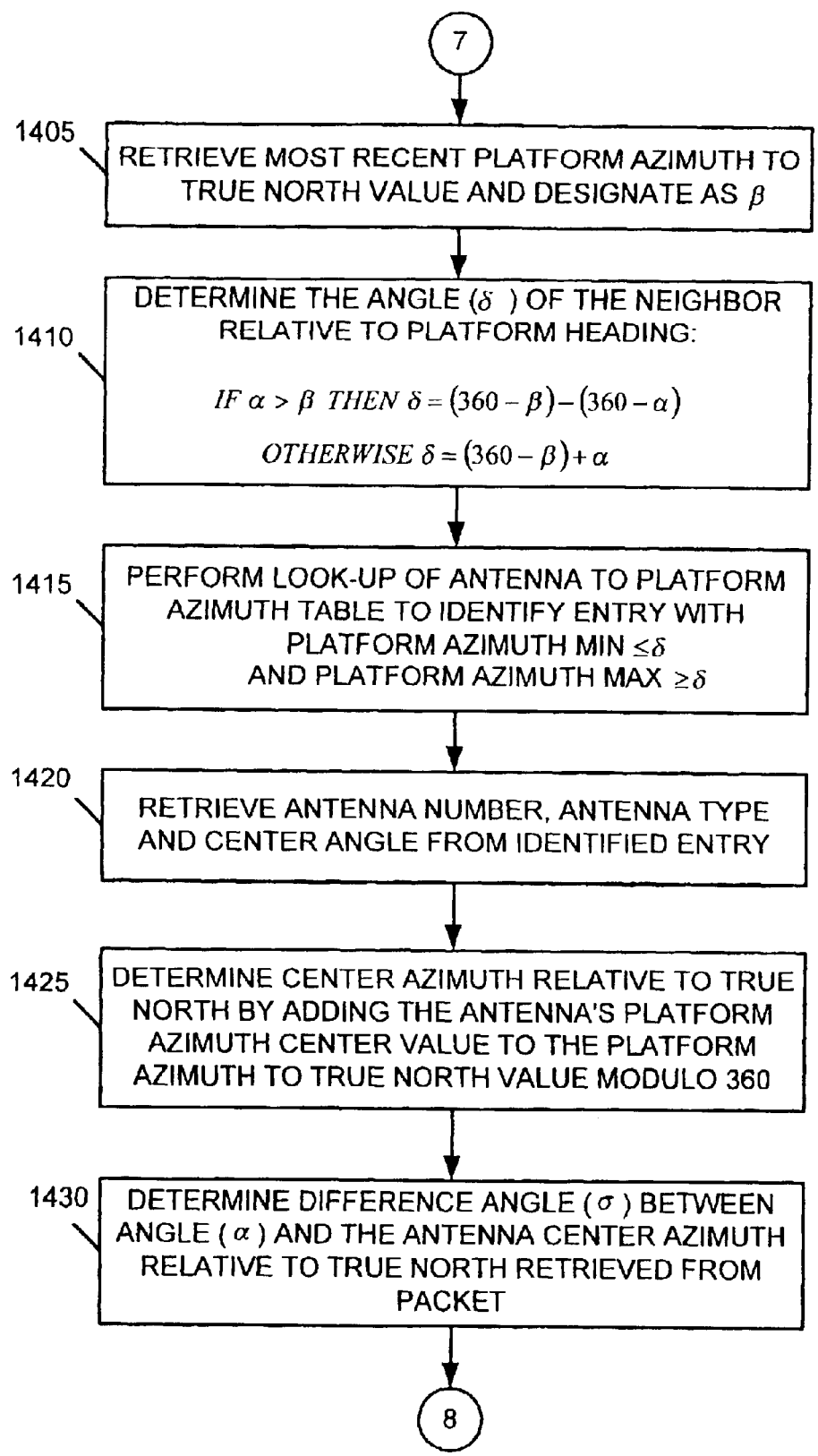

The most recent platform_azimuth_to_true_north value may be retrieved from memory and designated as $\beta$ [act 1405](FIG. 14). An angle ($\delta$) of the neighbor node relative to the platform heading of the current node may be determined [act 1410] in accordance with the following:

If $\alpha>\beta$ then $\delta=(360-\beta)-(360-\alpha)$ otherwise $\delta=(360-\beta)+\alpha$ Angle ($\delta$) may be in degrees, or may be converted to radians. A look-up of antenna to platform azimuth table 400 may be performed to identify an entry 405 with platform azimuth min 420$\leq\delta$ and platform azimuth max 430$\geq\delta$ [act 1415]. An antenna number 410, antenna type 415 and platform azimuth center value 430 may be retrieved from the identified entry 405 [act 1420]. A center azimuth relative to true north may be determined by adding the antenna's platform azimuth center angle 430 to the platform_azimuth_to_true_north value modulo 360 [act 1425].

Figure 15:
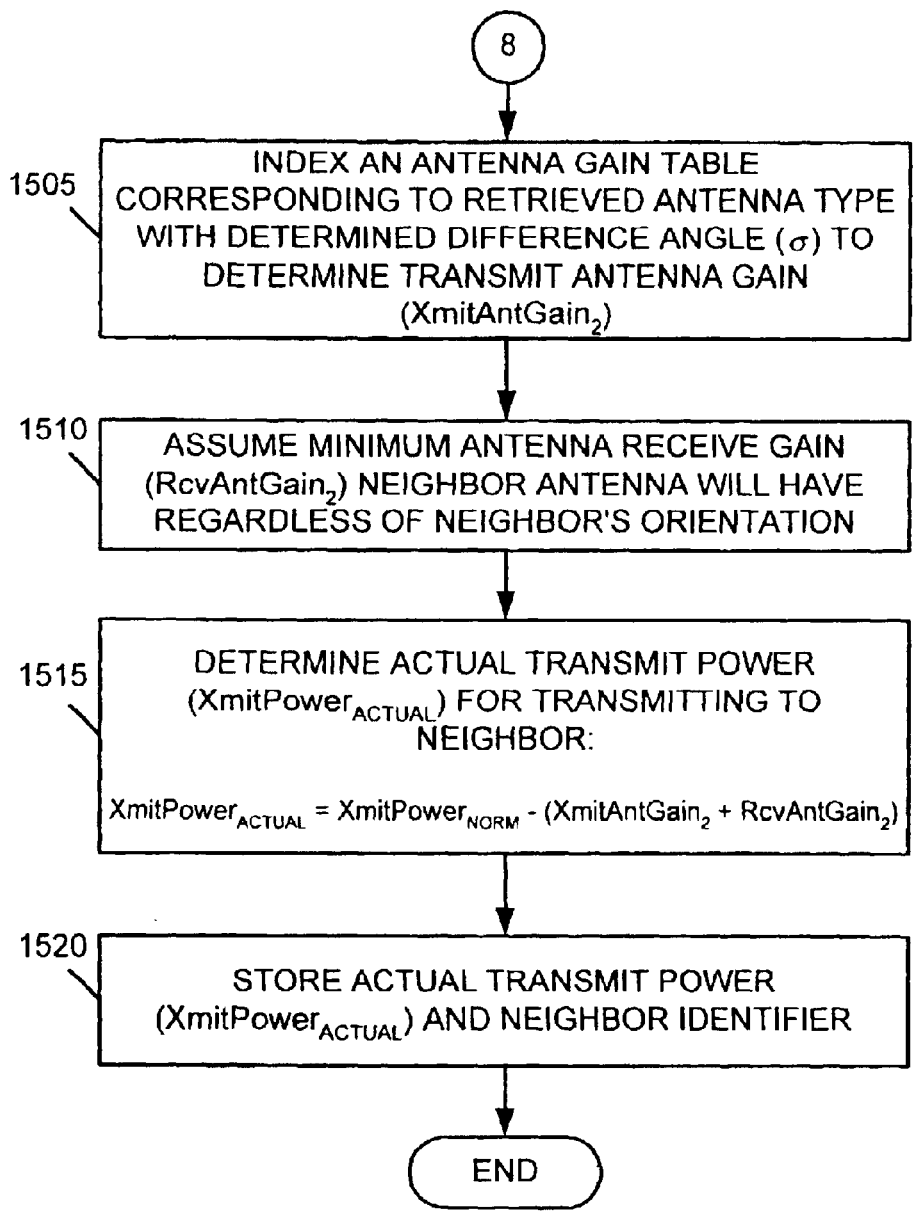

A difference angle ($\sigma$) between the angle $\alpha$ and the antenna center azimuth relative to true north value, extracted from the packet, may further be determined [act 1430]. An antenna gain table 600, that includes an antenna type 610 corresponding to the antenna type 415 retrieved from table 400, may be indexed with the determined difference angle ($\sigma$) to determine a transmit antenna gain value (XmitAntGain$_2$) of the directional antenna of the current node [act 1505](FIG. 15). The antenna center azimuth relative to true north value may be matched with an angle relative to center value 615 of table 600 to identify a table entry 605. The antenna gain 620 of the identified entry 605 may be designated as XmitAntGain$_2$. A minimum receive antenna gain (RcvAntGain$_2$), associated with the neighbor antenna may be assumed [act 1510]. This minimum receive antenna gain may represent some assumed minimum receive gain that the receiving antenna will have regardless of the orientation of the neighboring node (i.e., the neighbor's location, and not its orientation, may only be tracked in the exemplary process of FIGS. 10–11 above).

An actual transmit power (XmitPower$_{ACTUAL}$) for transmitting data to the neighbor may be determined [act 1515] according to the following relation:

$$\text{XmitPower}_{ACTUAL} = \text{XmitPower}_{NORM} - (\text{XmitAntGain}_2 + \text{RcvAntGain}_2) \quad \text{Eqn. (4)}$$

The determined actual transmit power XmitPower$_{ACTUAL}$ along with the neighbor identifier may be stored in an entry of neighbor transmit power table 700 as XmitPower 715 and neighbor ID 710, respectively [act 1520]. For any subsequent transmission of packets to a neighboring node, table 700 may be consulted for an appropriate transmit power to be used for transmitting to the neighboring node. Transmission of packets to a neighboring node may use the exemplary antenna selection process of co-pending application Ser. No. 10/355503, entitled "Systems and Methods for Antenna Selection in an Ad-Hoc Wireless Network."

CONCLUSION

Systems and methods consistent with the present invention, therefore, provide mechanisms for employing one or more directional antennas at nodes in an ad-hoc, multi-hop wireless network. Consistent with the present invention, directional antennas, such as, for example, switched beam or steered beam types of directional antennas, may be used for transmitting and/or receiving packets. In conjunction with the one or more directional antennas, location-determining techniques may, consistent with the present invention, be employed to determine locations of neighboring nodes in the network. The determined locations may be used as a basis for determining headings between a transmitting and receiving node that can, in conjunction with known antenna gain patterns associated with one or more directional antennas of the transmitting and receiving nodes, be used for selecting an appropriate transmit power that accounts for the orientation of the directional antennas of the transmitting and receiving nodes relative to one another.

The foregoing description of embodiments of the present invention provides illustration and description, but is not intended to be exhaustive or to limit the invention to the precise form disclosed. Modifications and variations are possible in light of the above teachings or may be acquired from practice of the invention. While series of acts have been described in FIGS. 8–15, the order of the acts may vary in other implementations consistent with the present invention. Also, non-dependent acts may be performed in parallel. No element, act, or instruction used in the description of the present application should be construed as critical or essential to the invention unless explicitly described as such. Also, as used herein, the article "a" is intended to include one or more items. Where only one item is intended, the term "one" or similar language is used.

The scope of the invention is defined by the following claims and their equivalents.

What is claimed is:

1. A method of determining transmit power at a first node in a wireless network, comprising:

receiving one or more messages from a second node, the one or more messages indicating a location of the second node and identifying a directional antenna associated with the second node that transmitted at least one of the one or more messages;

determining an angle between the identified directional antenna of the second node and the first node based on the location of the second node;

determining a gain of the identified directional antenna at the determined angle to produce a transmit antenna gain (XmitAntGain); and determining the transmit power for transmitting to the second node based on the transmit antenna gain.

2. The method of claim 1, wherein determining a gain of the identified directional antenna comprises:

maintaining a data table specifying antenna gains associated with an antenna gain pattern of the identified directional antenna; and indexing the data table with the determined angle to retrieve the transmit antenna gain (XmitAntGain) of the identified directional antenna.

3. The method of claim 1, further comprising:

determining a pathloss between the second node and the first node based on the determined transmit antenna gain (XmitAntGain), wherein determining the transmit power for transmitting to the second node is further based on the determined pathloss.

4. The method of claim 3, further comprising:

determining a receive antenna gain (RcvAntGain) associated with a second directional antenna of the first node that received the one or more messages.

5. The method of claim 4, further comprising:

measuring, at the first node, a receive power level (RcvPower) associated with at least one of the one or more messages.

6. The method of claim 5, wherein the one or more messages further indicate a transmit power level (XmitPower) at which at least one of the one or more messages was transmitted from the second node.

7. The method of claim 6, wherein the pathloss is determined based on the XmitPower, the XmitAntGain, the RcvAnt Gain and the RcvPower.

8. The method of claim 1, wherein the wireless network comprises a packet-switched network.

9. The method of claim 8, wherein the wireless network comprises an ad-hoc, multi-hop, wireless network.

10. A computer-readable medium containing instructions for controlling at least one processor to perform a method of determining transmit power at a first node in a wireless network, the method comprising:

receiving a message from a second node, the message indicating a direction a directional antenna that transmitted the message is pointing and a location of the second node;

determining an angle between the direction the directional antenna is pointing and the first node based on the location of the second node;

determining a gain of the directional antenna at the determined angle to produce a transmit antenna gain; and determining the transmit power for transmitting to the second node based on the transmit antenna gain.

11. The computer-readable medium of claim 10, wherein determining a gain of the directional antenna comprises:

maintaining a data table specifying antenna gains associated with an antenna gain pattern of the directional antenna; and indexing the data table with the determined angle to retrieve the transmit antenna gain (XmitAntGain) of the directional antenna.

12. The computer-readable medium of claim 10, further comprising:

determining a pathloss between the second node and the first node based on the determined transmit antenna gain (XmitAntGain), wherein determining the transmit power for transmitting to the second node is further based on the determined pathloss.

13. The computer-readable medium of claim 12, further comprising:
determining a receive antenna gain (RcvAntGain) associated with a second directional antenna of the first node that received the message.

14. The computer-readable medium of claim 13, further comprising:
causing the measurement, at the first node, of a receive power level (RcvPower) associated with the message.

15. The computer-readable medium of claim 14, wherein the message further indicates a transmit power level (XmitPower) at which the message was transmitted from the second node.

16. The computer-readable medium of claim 15, wherein the pathloss is based on the XmitPower, the XmitAntGain, the RcvAnt Gain and the RcvPower.

17. A first node in an ad-hoc wireless network, comprising:
an omni-directional antenna configured to receive a first message from a second node, the first message comprising a location of the second node;
a plurality of directional antennas;
a memory configured to store instructions; and
a processor configured to execute the instructions in the memory to:
receive, via a first directional antenna of the plurality of directional antennas, a second message from the second node, the second message identifying a second directional antenna associated with the second node that transmitted the second message,
determine an angle between the second directional antenna of the second node and the first node based on the location of the second node,
determine a gain of the second directional antenna at the determined angle to produce a transmit antenna gain (XmitAntGain), and
determine the transmit power for transmitting to the second node based on the transmit antenna gain.

18. The node of claim 17, the processor further configured to:
store a data table specifying antenna gains associated with an antenna gain pattern of the directional antenna in the memory; and
index the data table with the determined angle to retrieve the transmit antenna gain (XmitAntGain) of the directional antenna.

19. The node of claim 18, the processor further configured to:
determine a pathloss between the second node and the first node based on the determined transmit antenna gain (XmitAntGain),
wherein determining the transmit power for transmitting to the second node is further based on the determined pathloss.

20. The node of claim 19, the processor further configured to:
determine a receive antenna gain (RcvAntGain) associated with a second directional antenna of the first node that received the second message.

21. The node of claim 20, the processor further configured to:

initiate a measurement, at the first node, of a receive power level (RcvPower) associated with the second message.

22. The node of claim 21, wherein the second message further indicates a transmit power level (XmitPower) at which the second message was transmitted from the second node.

23. The node of claim 22, wherein the pathloss is determined based on the XmitPower, the XmitAntGain, the RcvAnt Gain and the RcvPower.

24. A method of determining a power level for transmitting to a neighboring node in a wireless network, comprising:
receiving, at a first node, one or more messages indicating a location of the neighboring node and a type of directional antenna of the neighboring node that transmitted the one or more messages; and
determining the power level for transmitting to the neighboring node based on the location of the neighboring node and the type of the directional antenna.

25. The method of claim 24, further comprising:
storing a data table specifying a plurality of antenna gains associated with an antenna gain pattern corresponding to the type of directional antenna; and
performing a look-up of the data table, based on data derived from the location of the neighboring node, to retrieve a transmit antenna gain from the plurality of antenna gains.

26. The method of claim 25, further comprising:
determining a pathloss between the neighboring node and the first node using the transmit antenna gain.

27. The method of claim 26, wherein determining the power level for transmitting to the neighboring node is further based on the determined pathloss.

28. A computer-readable medium containing instructions for controlling at least one processor to perform a method of determining a power level for transmitting to a neighboring node in a wireless network, the method comprising:
receiving, at a first node, one or more messages indicating a location of the neighboring node and a type of directional antenna of the neighboring node that transmitted the one or more messages; and
ascertaining the power level for transmitting to the neighboring node based on the location of the neighboring node and the type of the directional antenna.

29. The computer-readable medium of claim 28, the method further comprising:
storing a data table specifying a plurality of antenna gains associated with an antenna gain pattern corresponding to the type of directional antenna; and
performing a look-up of the data table, based on data derived from the location of the neighboring node, to retrieve a transmit antenna gain from the plurality of antenna gains.

30. The computer-readable medium of claim 29, the method further comprising:
determining a pathloss between the neighboring node and the first node using the transmit antenna gain.

31. The computer-readable medium of claim 30, wherein determining the power level for transmitting to the neighboring node is further based on the determined pathloss.

32. A first node in an ad-hoc wireless network, comprising:
a transceiver;
a memory configured to store instructions; and a processor configured to execute the instructions in the memory to:
receive, via the transceiver, one or more messages indicating a location of a neighboring node and a type of directional antenna of the neighboring node that transmitted the one or more messages, and
determine the power level for transmitting from the first node to the neighboring node based on the location of the neighboring node and the type of the directional antenna.

33. The node of claim 32, the memory further configured to:
store a data table specifying a plurality of antenna gains associated with an antenna gain pattern corresponding to the type of directional antenna; and
the processor further configured to:
perform a look-up of the data table, based on data derived from the location of the neighboring node, to retrieve a transmit antenna gain from the plurality of antenna gains.

34. The node of claim 33, the processor further configured to:
determine a pathloss between the neighboring node and the first node using the transmit antenna gain.

35. The node of claim 34, wherein determining the power level for transmitting to the neighboring node is further based on the determined pathloss.

36. A method of determining a transmit power level, comprising:
maintaining, at a first node, a data structure that describes an array of antenna gains associated with an antenna gain pattern of a directional antenna;
receiving a message, transmitted from the directional antenna at a second node, that indicates a direction the directional antenna was pointing when the message was transmitted and a second power level at which the message was transmitted from the second node;
retrieving an antenna gain from the data structure corresponding to the directional antenna and related to the direction the directional antenna was pointing;
controlling a first power level for transmitting from the first node to the second node based on the retrieved antenna gain
measuring a receive power associated with the received message; and
determining a pathloss between the first and second nodes based on the measured receive power, retrieved antenna gain, and the second power level.

37. The method of claim 36, wherein controlling the first power level for transmitting from the first node to the second node is further based on the determined pathloss.

38. A computer-readable medium containing instructions for controlling at least one processor to perform a method of determining a transmit power level for transmitting to a neighboring node, the method comprising:
storing a data structure that describes an array of antenna gains associated with an antenna gain pattern of a directional antenna;
receiving a message, transmitted from the directional antenna at the neighboring node, that indicates a direction the directional antenna was pointing when the message was transmitted and a power level at which the message was transmitted from the second node;
retrieving an antenna gain from the data structure based on the direction the directional antenna was pointing;
controlling transmit power for transmitting to the neighboring node based on the retrieved antenna gain;
measuring a receive power associated with the received message; and
determining a pathloss based on the measured receive power, retrieved antenna gain, and the power level.

39. The computer-readable medium of claim 38, wherein controlling the transmit power for transmitting to the neighboring node is further based on the determined pathloss.

40. A first node, comprising:
a transceiver;
a memory configured to store instructions and a data structure that describes an array of antenna gains associated with an antenna gain pattern of a directional antenna; and
a processor configured to execute the instructions in the memory to:
receive, via the transceiver, a message transmitted from the directional antenna at a second node that indicates a direction the directional antenna was pointing when the message was transmitted and a second power level at which the message was transmitted from the second node,
determine a receive power associated with the received message,
retrieve an antenna gain from the data structure based on the direction the directional antenna was pointing,
set a first power level for transmitting from the first node to the second node based on the retrieved antenna gain, and
determine a pathloss between the first and second nodes based on the determined receive power, retrieved antenna gain, and the second power level.

41. The node of claim 40, wherein controlling the first power level for transmitting from the first node to the second node is further based on the determined pathloss.

42. A system for determining a power level for transmitting to a neighboring node in a wireless network, comprising:
means for receiving a message indicating a location of the neighboring node and a type of directional antenna of the neighboring node that transmitted the message; and
means for determining the power level for transmitting to the neighboring node based on the location of the neighboring node and the type of the directional antenna.

* * * * *